July 14, 1970

H. T. HALIBRAND 3,520,205

IN AND OUT TRANSMISSION

Filed Oct. 16, 1968

INVENTOR.
HENRY T. HALIBRAND
BY
W. H. Maxwell
AGENT

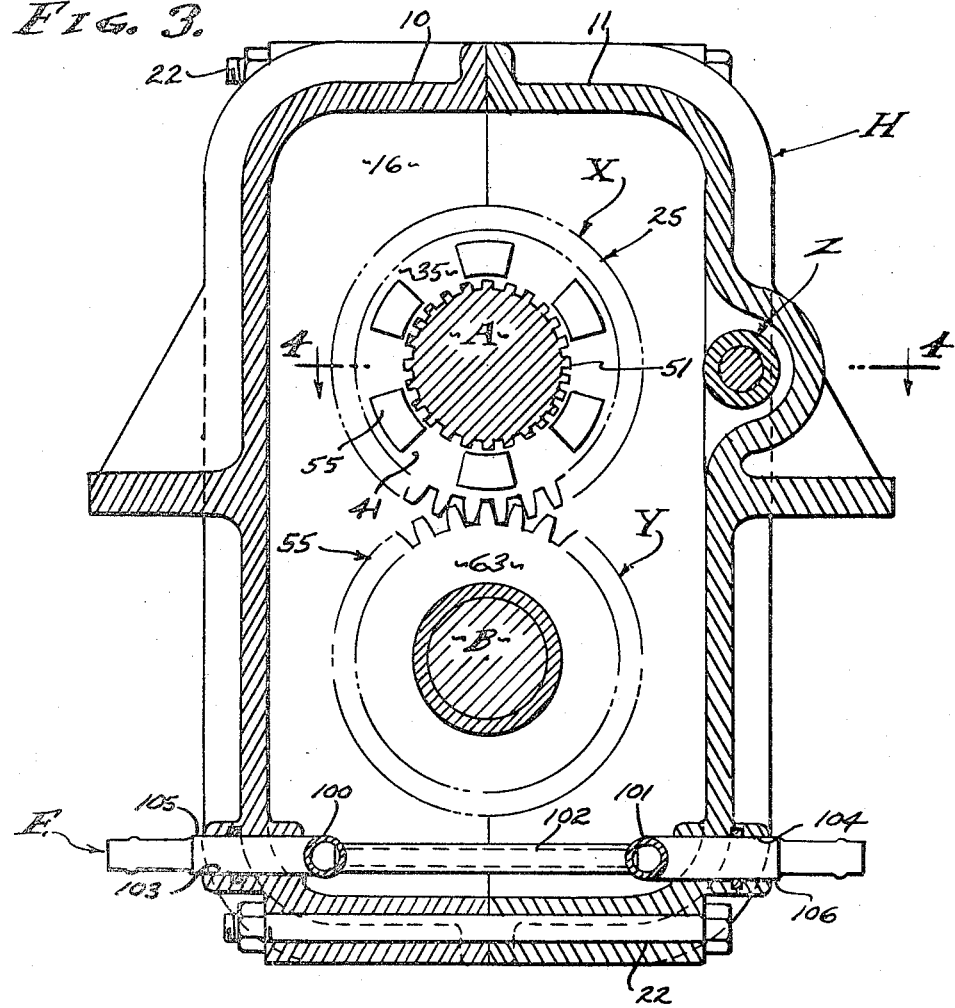
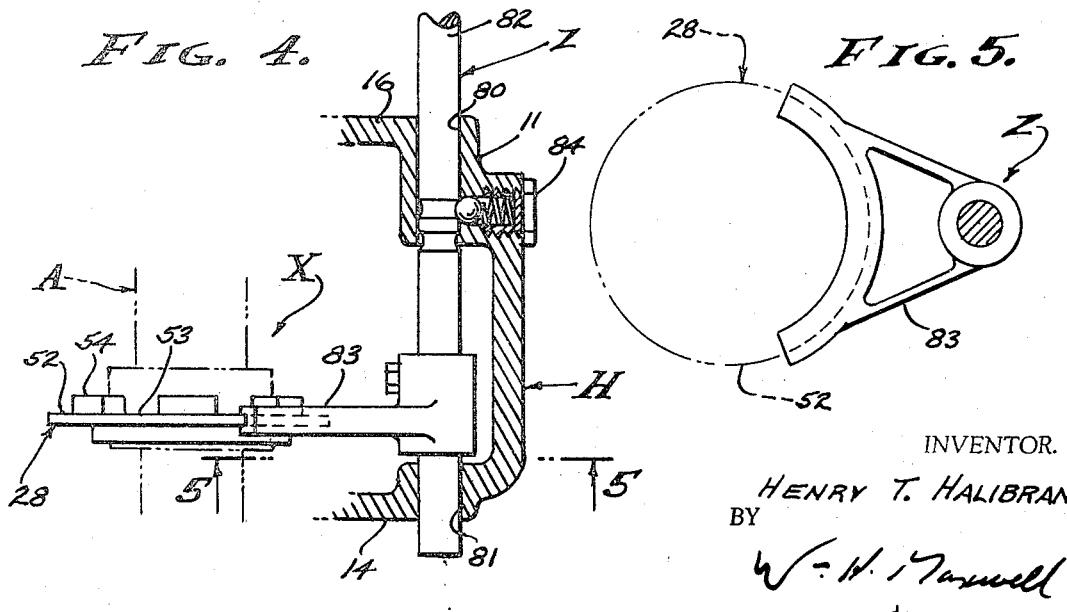

United States Patent Office 3,520,205
Patented July 14, 1970

3,520,205
IN AND OUT TRANSMISSION
Henry T. Halibrand, 6469 Nancy St.,
Los Angeles, Calif. 90045
Filed Oct. 16, 1968, Ser. No. 768,020
Int. Cl. F16h 57/00, 1/14, 57/02
U.S. Cl. 74—405                                    18 Claims

ABSTRACT OF THE DISCLOSURE

A marine transmission or the like wherein a propeller shaft is engaged and disengaged from a constantly revolving drive shaft, and providing an angle drive with or without speed change to increase or decrease the relative speed of the propeller shaft, and wherein the in and out feature is effective to completely disconnect the gear drive while permitting free rotation of the constantly revolving drive shaft; the gearing being comprised of a pair of constant meshed gears, one of which is fixed to the propeller shaft and the other of which is free to revolve on the drive shaft, and there being clutch means carried on said drive shaft and disengageably connecting the said other gear and drive shaft, there being a manual control for effecting the in and out of gear action, and with bearings associated with the two shafts respectively to absorb axial thrusts directly into the transmission case and to advantageously utilize radial thrust bearings for efficient antifriction capabilities of the transmission as a whole.

---

Figure 1:
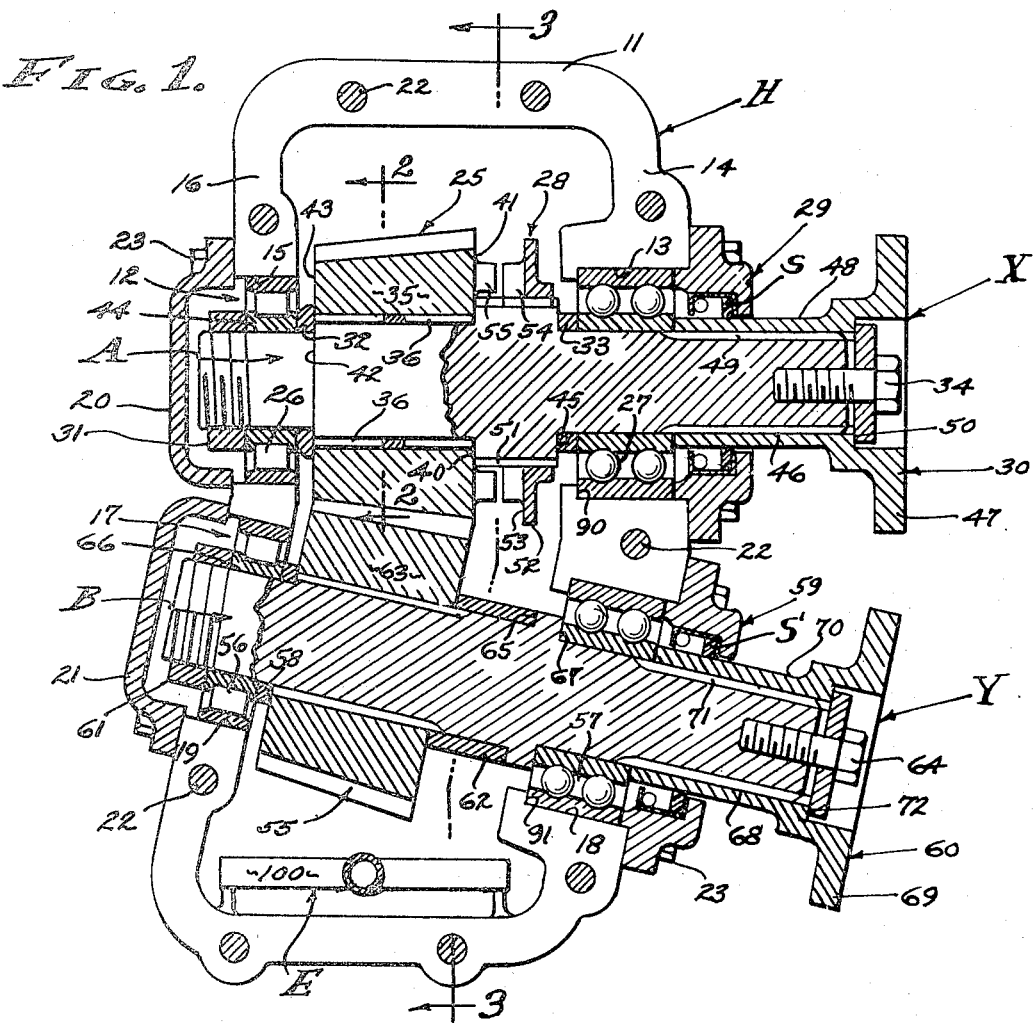

Transmissions of the type under consideration are provided for engagement between a prime mover and the part driven, for example between the engine and the propeller in a boat or the like. Most often, it is necessary to provide a power disconnect, and in such instances jaw clutches are built into the transmission for so called in and out control. That is, the unit is either in or out of gear. Further, the advantage of these jaw clutch transmissions is their compactness with highly efficient torque capabilities, and all of which is much to be desired in an angle drive wherein there is a propeller shaft extending reversely beneath a drive shaft. Speed change is always a problem and often a requirement, either to increase or decrease speed of the propeller shaft with respect to the speed of the drive shaft. And in such a transmission it has been found to be most advantageous to disconnect all elements from the drive shaft when the power is not to be taken therefrom. However, it is equally important to provide for immediate power engagement with facility, and without particular regard to speed of operation.

Prior art transmissions of the type herein referred to have been characterized by a separation of gearing and clutching and by the constant turning of the gearing regardless of clutch disengagement. And said prior art transmissions have been characterized by coffin-type cases and the like which impose structural limitations upon the shaft assemblies. Accordingly, it is an object of this invention to provide a novel case and bearing combination in such a transmission and whereby structural capabilities are increased, whereby axial thrusts are concentrated without affect upon the gearing, and whereby the two shafts have free end portions for independent radial support in efficient and durable antifriction bearings, and all to the end that gear loads are properly maintained over long periods of time without breakdown.

Another object of this invention is to cooperatively combine the gearing and clutching and to provide for the free independent antifriction carriage of the drive gear upon the drive shaft, and to this end needle bearings support the said drive gear upon the said drive shaft for complete disconnection and idle when the clutch is disengaged.

It is another object of this invention to provide a jaw clutch that engages directly from the drive shaft to the drive gear and to the end that they operate as one, there being the complete elimination of intermediate parts whereby inertial factors are minimized.

Still further, with transmissions of the type under consideration the transfer of high horsepower loads is accompanied by the generation of heat, and it is an object to provide an efficient heat exchanger of unit construction that is accommodated in and operable independently of the case construction, cooperating with the case for its assembly in working position therewith.

Figure 2:
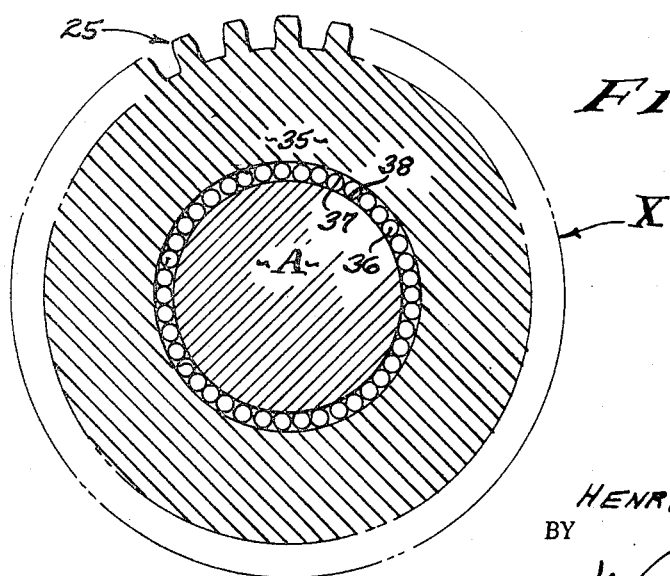

The various objects and features of this invention will be fully understood from the following detailed description of the typical preferred form and application thereof, throughout which description reference is made to the accompanying drawings, in which:

FIG. 1 is a longitudinal sectional view taken vertically through the central plane of the transmission. FIG. 2 is an enlarged sectional view of the drive shaft and drive gear taken as indicated by line 2—2 on FIG. 1. FIG. 3 is a transverse sectional view taken as indicated by line 3—3 on FIG. 1. FIG. 4 is a fragmentary view of a portion of the structure taken as indicated by line 4—4 on FIG. 3, and FIG. 5 is a fragmentary view taken as indicated by line 5—5 on FIG. 4.

The transmission is primarily a boat transmission and is either capable of being engaged or disengaged, to drive forwardly or remain in a neutral condition. In its preferred form as shown and described, there is a drive shaft A and a propeller shaft B controlled for the two functions of drive and neutral. As is shown, the transmission comprises, generally, a housing H, a drive shaft and clutch assembly X, a propeller shaft assembly Y, and a clutch control assembly Z that determines rotation of the gearing and propeller shaft B. Both the drive shaft A and propeller shaft B are straight through shafts, the drive gear of assembly X being coaxially journaled over the shaft A. In addition to the drive shaft A, the propeller drive shaft and clutch assembly X includes the principal elements of the drive or clutch means, the primary gear, and all antifriction bearings, spacers, retainers and fasteners effecting an assembled condition as a unit, as will later be described. The propeller shaft assembly Y is also assembled as a complete unit, and it is these two units X and Y that are embraced by housing sections of longitudinally split half-shell configuration. Further, one of the housing sections carries the clutch control assembly Z that cooperates with the drive or clutch means carried with said assembly X.

The housing H is, in accordance with the invention, a longitudinally split half-shell case that establishes the frame of the transmission, preferably formed as by casting a pair of mating elements 10 and 11. The housing configuration can vary as circumstances require, a typical V-drive case being illustrated. For example, a typical marine power plant installation involves a prime mover disposed on a substantially horizontal axis with its drive end faced forwardly. This arrangement necessarily places the prime mover toward the stern and requires a reversal of the propeller shafting and an angular displacement thereof as well. Consequently, the transmissions employed for this purpose are referred to as V-drives and which involve, generally, gear boxes with angularly related input and output shafts. In practice (but not shown) the input shaft is on the axis of the prime mover and coupled thereto by means of a shaft with universal joints; and the output shaft is rearwardly divergent, for instance at 12°, from the input shaft so as to project beneath the prime mover and to pass through a shaft log, etc., to carry and drive a propeller. It is to be understood that the installation can be accomplished to suit circumstances, and accordingly the housing H is angular in configuration with spaced angularly related bores to receive and carry the shaft assemblies X and Y.

The half-shell housing H is split in a vertical plane coincidental with the axes of the two bores therein that carry the assemblies X and Y respectively. There is an upper bore 12 through the housing and comprised of a shouldered opening 13 in the rear wall 14 of the housing and a through opening 15 in the front wall 16 of the housing. And there is a lower bore 17 through the housing and comprised of a shouldered opening 18 in the rear wall 14 of the housing and a through opening 19 in the front wall 16. The drive and propeller shafts A and B enter the housing H through the shouldered openings 13 and 18, the assemblies X and Y including retainers that close the said openings with seals surrounding the shafts respectively. The through openings 15 and 19 are closed by cover plates 20 and 21 establishing a closed chamber within the housing. The mating elements 10 and 11 of the housing H are coupled by means of transverse fasteners 22, and the bearing retainers and cover plates 20 and 21 are then coupled to the half-shell assembly by means of longitudinal fasteners 23, preferably cap-screws threaded into the front wall 16.

The drive shaft A in its drive shaft and clutch assembly X is unique with the present invention and is combined as a unit with a primary drive gear 25 and its supporting bearings 26 and 27, with a clutch element 28, with a retainer 29 and a seal S, with a coupling 30, with a lock-nut 31, spacer rings 32 and 33 and with a fastener 34. And in accordance with the invention, the drive gear 25 has a hub 35 telescopically engaged over drive shaft A and journaled concentrically thereon by means of antifriction bearings 36, preferably spaced roller or needle bearings adapted to accurately center gear 25 with shaft A and to absorb radial thrust. Normally therefore, the gear 25 is free to revolve on shaft A, the gear and shaft having spaced cylindrical bearing surfaces 37 and 38 between which the needles of bearings 36 are longitudinally disposed. In its preferred form the gear 25 and its hub 35 are integral and of sufficient axial extent to establish stability of these two elements with the needle bearing support therebetween.

The drive shaft A is stepped for the placement of the primary drive gear 25 and supporting bearings 26 and 27, there being a forwardly disposed step 40 to frictionally engage and locate the rear face 41 of the gear and a forwardly disposed step 42 to stop the spacer ring 32 for its frictional engagement with a location of the forward face 43 of the gear. As shown, the inner race of supporting bearing 26 is then installed upon the turned forward end portion 44 of the shaft and secured in position against the spacer ring 32 by the lock-nut 31. The drive shaft A is also stepped for its longitudinal placement within the housing H, there being a rearwardly disposed step 45 to stop the spacer ring 33 for its location of the inner race of supporting bearing 27 that is installed upon the turned rearward end portion 46 and then secured in position against the spacer ring and step by the coupling 30. The axial thickness of the spacer ring 33 is selective so as to enable proper longitudinal placement of the primary gear 25. The retainer 29 and seal S pressed therein is then assembled onto the coupling 30, the said coupling being comprised of a drive flange 47 and a forwardly extending turned hub 48. The terminal rear end portion of the shaft A is splined and a matching splined bore is provided in the hub at 49, and the fastener 34 is threadedly engaged into said end portion 48 and against a shoulder 50 on the coupling to draw it forwardly into clamped positioning engagement with the inner race of bearing 27. The drive shaft assembly is no completed with the retainer loosely carried over the hub through the engagement of the seal S thereon.

Preliminary to assembly of the rear elements of the assembly X as above described, the clutch element 28 is also installed thereon. In accordance with the invention, the shaft A is provided with splines at 51 in its major diameter extending between the first described step 40 and the last described step 45, and the clutch element 28 is slideably operable between said two steps. As shown, the clutch element 28 is a circular element that surrounds the shaft A, with a splined bore at 51, and comprised of a peripheral flange 52 and a forwardly disposed drive face 53 opposed to the rear face 41 of the gear. Circumferentially spaced axially projecting drive dogs 54 and 55 extend from the face 53 and 41 respectively, for mating engagement when brought together. Consequently, when the clutch element 28 is separated from the drive gear 25, by shifting it rearwardly, the dogs are disengaged (see FIG. 1). With the clutch element installed as described the drive shaft and clutch assembly X is complete and ready for installation as a unit in the housing H.

The propeller shaft assembly Y is also unique with the present invention and is combined as a unit with a secondary driven gear 55 and its supporting bearings 56 and 57, with a spacer ring 58, with a retainer 59 and seal S', with a coupling 60, with a lock-nut 61, spacer ring 62 and with a fastener 64. And in accordance with the invention, the driven gear 55 has a hub 63 removably splined onto propeller shaft B, the shaft having a forwardly disposed step 65 to stop the rear face of gear 55 in placement on the shaft, and secured in position by the spacer ring 58 stopping the front face of gear 55. As shown, the inner race of supporting bearing 56 is then installed upon the turned forward end portion 66 of the shaft and secured in position against the spacer ring 58 by the lock-nut 61. The propeller shaft A is also stepped for its longitudinal placement within the housing H, there being a rearwardly disposed step 67 to stop the inner race of supporting bearing 57, that is installed upon the turned rearward end portion 68 and then secured in position against the step 67 by the coupling 60. The spacer ring 62 is of selective axial thickness so as to enable proper longitudinal placement of the secondary driven gear 55. The retainer 59 and seal S' pressed therein is then assembled onto the coupling 60, the said coupling being comprised of a drive flange 69 and a forwardly extending turned hub 70. The terminal rear end portion of the shaft A is splined and a matching splined bore is provided in the hub at 71, and the fastener 64 is threadedly engaged into said end portion 68 and against a shoulder 72 on the coupling to draw it forwardly into clamped positioning engagement with the inner race of bearing 57. The propeller shaft assembly Y is now completed with the retainer loosely carried over the hub 70 through the engagement of the seal S' thereon.

The clutch control assembly Z is provided to position the clutch element 28, to slide it on the splines at 51 into and out of engagement with the drive gear face 41. In accordance with the invention, one of the housing elements, 11 for example, is provided with aligned bores 80 and 81 in the front and rear walls 16 and 14 of the housing, on an axis laterally offset from the axis of the drive shaft A. Generally, the assembly Z comprises a shifting rod 82 slideably engaged through said bores 80–81, a fork or clevis 83 embracing the peripheral flange 52 of the clutch element 28, and a detent means 84 to position the shifting rod 82. The clevis 83 is fixed to the rod 82 to move therewith and the rod is indented at two positions as shown in order to be held positioned thereat by a spring loaded ball of the detent means 84.

The transmission includes a heat exchanger E which is a completely assembled and/or fabricated unit independent of the housing elements H and captured therein in operative position when the housing is assembled as later described. The heat exchanger E is a tubular framelike structure that overlies the bottom of the housing H, and it comprises a pair of headers 100 and 101 between which heat transfer tubes 102 extend. Aligned openings and preferably transverse bores 103 and 104 extend through the side walls of the housing elements 10 and 11, and the heat exchanger frame is provided with inlet and outlet tubes 105 and 106 that extend through said bores for support of the unit. As shown, O-ring seals are carried in the bores for sealing engagement with said tubes, and the tubes 105 and 106, the headers 100 and 101, and the heat transfer tubes 102 are in open communication with each other for conducting coolant therethrough. In practice, the parts of the heat exchanger frame are welded or braised together and establish a tight and reliable unit independent of the housing structure.

Assembly of the in and out transmission is effected by initially installing the clutch control assembly Z in the housing element 11 as last described, together with installation of the heat exchanger E as previously described, followed by placement of the drive shaft and clutch assembly X and of the propeller shaft assembly Y in the half bores 12 and 17 with the outer races of the bearings 27 and 57 seated in the half bore openings 13 and 18 respectively. The bearings 26 and 56 are freely positioned in the half bore openings 15 and 19. The housing element 10 is then installed over the related assemblies, the primary gear 25 and secondary gear 55 being intermeshed for driving engagement. The housing elements 10 and 11 are held in alignment through the fit of the bearings in the bores and through the securement of the transverse fasteners 22. As shown, the combined half shell elements 10 and 11 present a shoulder 90 in the bore opening 13 and a shoulder 91 in the bore opening 18, and the bearings 12 and 17 seat respectively against said shoulders 90 and 91 when pressed thereto by the retainers 29 and 59. The cover plates 20 and 21 are then installed and the transmission is complete. It will be apparent that the transmission as it is hereinabove described completely satisfies the objectives set forth herein and that the gearing is completely in disuse when the clutch is disengaged, and that the drive gear is directly engaged for effective power transmission when the clutch element is manually shifted into said engaged position.

Having described my invention, I claim:

1. An in and out of gear constant mesh transmission comprising, a split housing divided on a plane coincidental with the axes of upper and lower bores therein, a drive shaft and clutch assembly journaled on bearings carried in the upper bore and including a drive gear normally rotatable on a drive shaft and a clutch element splined to shift longitudinally on said drive shaft into and out of driving engagement with the drive gear, a propeller shaft assembly journaled on bearings carried in the lower bore and including a driven gear continuously intermeshed with the first mentioned drive gear, and a clutch control assembly including a manually shiftable part movable in the housing and embracing the clutch element to move it into and out of engagement with the drive gear.

2. The in and out constant mesh transmission as set forth in claim 1, wherein there is a shoulder in the opening through the housing of each upper and lower bore respectively, and wherein the drive shaft and clutch assembly has a radial and axial thrust bearing fixed thereon and seated against the shoulder in the upper bore, and wherein the propeller shaft assembly has a radial and axial thrust bearing fixed thereon and seated against the shoulder in the lower bore.

3. The in and out constant mesh transmission as set forth in claim 1, wherein there is a shoulder in the opening through one end of the housing of each upper and lower bore respectively, and wherein the drive shaft and clutch assembly has a radial and axial thrust bearing fixed on one end thereof and seated against the shoulder in the upper bore and has a radial thrust bearing fixed on the other end thereof and slideably positioned in the opening through the other end of the housing, and wherein the propeller shaft assembly has a radial and axial thrust bearing fixed on one end thereof and seated against the shoulder in the lower bore and has a radial thrust bearing fixed on the other end thereof and slideably positioned in the opening through the other end of the housing.

4. The in and out constant mesh transmission as set forth in claim 1, wherein there is a shoulder in the opening through the housing of each upper and lower bore respectively, and wherein the drive shaft and clutch assembly has a radial and axial thrust bearing fixed against a step on the drive shaft by a coupling hub telescopically engaged over the end portion of the drive shaft and secured thereto and said bearing seated against the shoulder in the upper bore, and wherein the propeller shaft assembly has a radial and axial thrust bearing fixed against a step on the propeller shaft by a coupling hub telescopically engaged over the end portion of the propeller shaft and secured thereto and said bearing seated against the shoulder in the lower bore.

5. The in and out constant mesh transmission as set forth in claim 1, wherein there is a shoulder in the opening through the housing of each upper and lower bore respectively, and wherein the drive shaft and clutch assembly has a radial and axial thrust bearing fixed against a step on the drive shaft by a coupling hub telescopically engaged over the end portion of the drive shaft and secured thereto and has a retainer holding said bearing seated against the shoulder in the upper bore, and wherein the propeller shaft assembly has a radial and axial thrust bearing fixed against a step on the propeller shaft by a coupling hub telescopically engaged over the end portion of the propeller shaft and secured thereto and a retainer holding said bearing seated against the shoulder in the lower bore.

6. The in and out constant mesh transmission as set forth in claim 1, wherein there is a shoulder in the opening through the housing of each upper and lower bore respectively, and wherein the drive shaft and clutch assembly has a radial and axial thrust bearing fixed against a step on the drive shaft by a coupling hub telescopically engaged over the end portion of the drive shaft and secured thereto and has a retainer and seal surrounding the hub and holding said bearing seated against the shoulder in the upper bore, and wherein the propeller shaft assembly has a radial and axial thrust bearing fixed against a step on the propeller shaft by a coupling hub telescopically engaged over the end portion of the propeller shaft and secured thereto and has a retainer and seal surrounding the hub and holding said bearing seated against the shoulder in the lower bore.

7. The in and out constant mesh transmission as set forth in claim 1, wherein there is a shoulder in the opening through one end of the housing of each upper and lower bore respectively, and wherein the drive shaft and clutch assembly has a radial and axial thrust bearing fixed against a step on the drive shaft and a coupling hub telescopically engaged over the end portion of the drive shaft and secured thereto and said bearing seated against the shoulder in the upper bore and has a radial thrust bearing fixed on the other end thereof and slideably positioned in the opening through the other end of the housing, and wherein the propeller shaft assembly has a radial and axial thrust bearing fixed against a step on the propeller shaft by a coupling hub telescopically engaged over the end portion of the propeller shaft and secured thereto and said bearing seated against the shoulder in the bore and has radial thrust bearing fixed on the other end thereof and slideably positioned in the opening through the other end of the housing.

8. The in and out constant mesh transmission as set forth in claim 1, wherein there is a shoulder in the opening through one end of the housing of each upper and lower bore respectively, and wherein the drive shaft and clutch assembly has a radial and axial thrust bearing fixed against a step on the drive shaft and a coupling hub telescopically engaged over the end portion of the drive shaft and secured thereto and has a retainer holding said bearing seated against the shoulder in the upper bore and has a radial thrust bearing fixed on the other end thereof and slideably positioned in the opening through the other end of the housing, and wherein the propeller shaft assembly has a radial and axial thrust bearing fixed against a step on the propeller shaft by a coupling hub telescopically engaged over the end portion of the propeller shaft and secured thereto and has a retainer holding said bearing seated against the shoulder in the bore and has radial thrust bearing fixed on the other end thereof and slideably positioned in the opening through the other end of the housing.

9. The in and out constant mesh transmission as set forth in claim 1, wherein there is a shoulder in the opening through one end of the housing of each upper and lower bore respectively, and wherein the drive shaft and clutch assembly has a radial and axial thrust bearing fixed against a step on the drive shaft and a coupling hub telescopically engaged over the end portion of the drive shaft and secured thereto and has a retainer and seal surrounding the hub and holding said bearing seated against the shoulder in the uper bore and has a radial thrust bearing fixed on the other end thereof and slideably positioned in the opening through the other end of the housing, and wherein the propeller shaft assembly has a radial and axial thrust bearing fixed against a step on the propeller shaft by a coupling hub telescopically engaged over the end portion of the propeller shaft and secured thereto and has a retainer and seal surrounding the hub and holding said bearing seated against the shoulder in the bore and has radial thrust bearing fixed on the other end thereof and slideably positioned in the opening through the other end of the housing.

10. An in and out transmission comprised of a split housing and two completely self-contained shaft assemblies; said housing being divided on a central vertically disposed plane of joinder coincidental with the axes of upper and lower bores having openings through the front and rear walls of the housing; one shaft assembly being the drive shaft assembly and comprising, a shaft with oppositely faced steps, a radial thrust bearing secured to the foremost step and slideably carried in the upper opening through the front wall of the housing, a radial and axial thrust bearing secured to the rearmost step and seated against a rearwardly faced shoulder in the upper opening through the rear wall of the housing, a drive gear on said shaft intermediate the steps thereon and a clutch element shiftably splined to the shaft to move into and out of engagement with the drive gear; and the other shaft assembly being the propeller shaft assembly and comprising, a shaft with oppositely faced steps, a radial thrust bearing secured to the foremost step and slideably carried in the lower opening through the front wall of the housing, a radial and axial thrust bearing secured to the rearmost step and seated against a rearwardly faced shoulder in the lower opening through the rear wall of the housing, and a driven gear on said shaft intermediate the steps thereon and meshed with the first mentioned gear, and controllable means embracing the clutch element to engage and disengage it from the drive gear.

11. The transmission as set forth in claim 10, wherein the drive gear is rotatable on the drive shaft between a spacer ring stopped by the first mentioned step and a step on said shaft opposed thereto, and wherein the clutch element is slideably splined between the last mentioned and second mentioned step and directly disengageable with the drive gear.

12. The transmission as set forth in claim 10, wherein said radial and axial thrust bearings are each secured to the rearmost step by means of a hub telescopically engaged over the rear portion of the shaft respectively.

13. The transmission as set forth in claim 10, wherein said radial and axial thrust bearings are each secured to the rearmost step by means of a hub telescopically engaged over the rear portion of the shaft respectively, said hub being drawn into clamped engagement with the bearing by means of a fastener threadedly engaged into the shaft and against a shoulder on the hub respectively.

14. The transmission as set forth in claim 10, wherein the radial and axial thrust bearings are each secured to the rearmost step by means of a hub telescopically engaged over the rear portion of the shaft respectively, and wherein each shaft assembly is positioned to the housing by means of a retainer secured to the rear wall of the housing in clamped engagement with the bearing seated against the shoulder in the rearmost opening respectively.

15. The transmission as set forth in claim 10, wherein the radial thrust bearings are each secured to the rearmost step by means of a hub telescopically engaged over the rear portion of the shaft respectively, and wherein each shaft assembly is positioned to the housing by means of a retainer having a seal surrounding and engaged with the hub and secured to the rear wall of the housing in clamped engagement with the bearing seated against the shoulder in the rear wall opening respectively.

16. A transmission comprised of a split housing and two completely self-contained shaft assemblies; said housing being divided on a central vertically disposed plane of joinder coincidental with the axes of upper and lower bores and each having openings through the front and rear walls of the housing, and having aligned openings opposite the plane of joinder in the sump area of the housing, one shaft assembly being a drive shaft assembly with spaced bearings carried in the front and rear openings of the upper bore, and with a drive gear intermediate said bearings; and the other shaft assembly being the propeller shaft assembly with spaced bearings carried in the front and rear openings of the lower bore, and with a driven gear intermediate said bearings and intermeshed with the first mentioned gear; and a heat exchanger unit comprising heat transfer tubes extending between opposite headers carried in and extending through the aligned openings in the sump area to be exposed to lubricant therein, said tubes and headers being in open communication for the passage of coolant through the exchanger.

17. The transmission as set forth in claim 16 and wherein there is a multiplicity of heat transfer tubes extending between the opposite headers and said headers having oppositely projecting tubes in open communication therewith and projected through the housing openings for external inlet and exhaust of coolant.

18. The transmission as set forth in claim 16 and wherein the opposite aligned openings in the sump area are coaxial bores and wherein said headers have oppositely projecting tubes extended through said bores and sealed therein for external inlet and exhaust of coolant.

References Cited

UNITED STATES PATENTS

| | | | |
|---|---|---|---|
| 3,256,746 | 6/1966 | Smith | 74—417 |
| 3,350,958 | 11/1967 | Casale | 74—417 |
| 3,382,838 | 5/1968 | Bergstedt | 74—417 X |

LEONARD H. GERIN, Primary Examiner

U.S. Cl. X.R.

74—417, 606; 115—34